US005582494A

United States Patent [19]

Cook

[11] Patent Number: 5,582,494
[45] Date of Patent: * Dec. 10, 1996

[54] TOOL HOLDER SYSTEM AND METHOD OF USE

[76] Inventor: Harold D. Cook, 7121 Santee, Westminster, Calif. 92683

[ * ] Notice: The term of this patent shall not extend beyond the expiration date of Pat. No. 5,311,654.

[21] Appl. No.: 334,211

[22] Filed: Nov. 3, 1994

Related U.S. Application Data

[63] Continuation of Ser. No. 49,085, Apr. 15, 1993, abandoned, which is a continuation of Ser. No. 496,810, Mar. 20, 1990, abandoned, which is a continuation of Ser. No. 293,817, Jan. 5, 1989, abandoned, which is a division of Ser. No. 63,975, Jun. 19, 1987, abandoned, which is a division of Ser. No. 930,687, Nov. 12, 1986, Pat. No. 4,818,161, which is a continuation of Ser. No. 787,034, Oct. 15, 1985, abandoned.

[51] Int. Cl.⁶ .............................. B23C 9/00; B23B 31/10
[52] U.S. Cl. ................ 409/234; 29/447; 29/508; 29/517; 279/9.1; 279/158; 408/239 R
[58] Field of Search ...................... 409/231–234, 409/136, 131, 132; 76/108, 100.6; 279/158, 9.1, 102, 103, 4.06, 20, 4.01, 906, 145, 158; 408/239 P, 239 R, 240, 238.57, 146.59; 299/81, 91; 29/447, 508, 517, 516

[56] References Cited

U.S. PATENT DOCUMENTS

| | | |
|---|---|---|
| 1,285,589 | 11/1918 | Barnes . |
| 1,404,016 | 1/1922 | Engelbrekt . |
| 1,409,753 | 3/1922 | Moore . |
| 1,539,413 | 5/1925 | Fish . |
| 1,658,504 | 2/1928 | Weiss . |
| 1,936,498 | 11/1933 | Corbett ................................. 76/108 |
| 1,994,792 | 3/1935 | Sanderson ............................. 255/63 |
| 2,125,005 | 7/1938 | Jearum ................................... 29/96 |
| 2,161,062 | 6/1939 | Killgore ................................. 262/33 |
| 2,374,919 | 5/1945 | Bruseth .................................. 90/11 |
| 2,729,458 | 1/1956 | Sacrey .................................. 279/41 |
| 2,860,547 | 11/1958 | Stephan ................................... 90/11 |
| 2,893,291 | 7/1959 | Hollis ..................................... 90/11 |
| 2,913,935 | 11/1959 | Flannery et al. ......................... 77/58 |
| 2,918,290 | 12/1959 | Werstein ................................ 279/19 |
| 2,920,913 | 1/1960 | Antila .................................. 287/119 |
| 2,942,891 | 6/1960 | Zale .................................... 279/158 |
| 3,053,118 | 9/1962 | Lavallee ................................ 76/108 |
| 3,221,404 | 12/1965 | Averill et al. ......................... 29/568 |

(List continued on next page.)

FOREIGN PATENT DOCUMENTS

| | | | |
|---|---|---|---|
| 26751 | 11/1981 | European Pat. Off. ............. 279/11 S |
| 662704 | 7/1938 | Germany ............................. 279/9.1 |
| 2229374 | 1/1974 | Germany ............................. 279/1 A |
| 2759007 | 8/1978 | Germany ......................... 408/239 A |
| 2811977 | of 1980 | Germany . |
| 16976 | 2/1978 | Japan ................................... 279/1 A |
| 57-107710 | 7/1982 | Japan ................................... 279/9.1 |
| 551065 | 2/1942 | United Kingdom . |
| 729295 | 5/1955 | United Kingdom ..................... 279/8 |
| 921522 | 3/1963 | United Kingdom ................. 340/279 |
| 1319200 | 6/1973 | United Kingdom . |
| 2137124 | 10/1984 | United Kingdom ..................... 279/7 |

OTHER PUBLICATIONS

Coolant Adapters (Flush–Cut) by X–L Tool Company–1 page.

*Primary Examiner*—William R. Briggs
*Attorney, Agent, or Firm*—Stetina Brunda & Buyan

[57] ABSTRACT

An improved tool holder system and method of using the same is disclosed, characterized by use of a plural extension member assemblies which permit the rapid adaptation of conventional machine tool holders for use in both automated machine tool changers as well as manual machine tool changer systems. In addition, the present invention discloses an improved method of mounting a cutting tool within a tool holder to accurately position the cutting tool height within the tool holder and subsequently prevent any backing out of the cutting tool from the tool holder during the cutting operation. Further, an improved apparatus and method of ensuring concentric mounting cutting tool within a tool holder is disclosed.

4 Claims, 3 Drawing Sheets

U.S. PATENT DOCUMENTS

| | | | |
|---|---|---|---|
| 3,307,243 | 3/1967 | Andreasson | 29/106 |
| 3,372,951 | 3/1968 | McCash | 287/91 |
| 3,397,615 | 8/1968 | Meinke | 90/11 |
| 3,424,055 | 1/1969 | Rollat | 90/11 |
| 3,557,419 | 1/1971 | Flannery | 29/105 |
| 3,734,515 | 5/1973 | Dudek | 279/1 A |
| 3,807,804 | 4/1974 | Kniff | 299/91 |
| 3,937,587 | 2/1976 | Lindem et al. | 408/181 |
| 3,945,752 | 3/1976 | Bennett | 408/146 |
| 3,989,260 | 11/1976 | Zonkov et al. | 279/4 |
| 3,994,615 | 11/1976 | Narang | 408/226 |
| 4,021,051 | 5/1977 | Toyomoto et al. | 279/1 N |
| 4,099,889 | 7/1978 | Vig | 408/239 R |
| 4,133,545 | 1/1979 | Komori | 279/83 |
| 4,226,562 | 10/1980 | Schmid et al. | 409/233 |
| 4,251,132 | 2/1981 | Mitin et al. | 299/69 |
| 4,274,774 | 6/1981 | Haga et al. | 409/232 |
| 4,453,775 | 6/1984 | Clemmow | 299/81 |
| 4,619,564 | 10/1986 | Jacobson | 408/146 |
| 4,668,138 | 5/1987 | Carter | 409/234 |
| 4,795,292 | 1/1989 | Dye | 409/136 |
| 4,808,049 | 2/1989 | Cook | 409/234 |
| 4,818,161 | 4/1989 | Cook | 409/233 |
| 4,934,743 | 6/1990 | Kapgan et al. | 285/23 |
| 4,971,491 | 11/1990 | Cook | 409/131 |
| 5,048,375 | 9/1991 | Kobayashi | 76/108.6 |
| 5,277,435 | 1/1994 | Kramer et al. | 279/9.1 |
| 5,311,654 | 5/1994 | Cook | 29/447 |

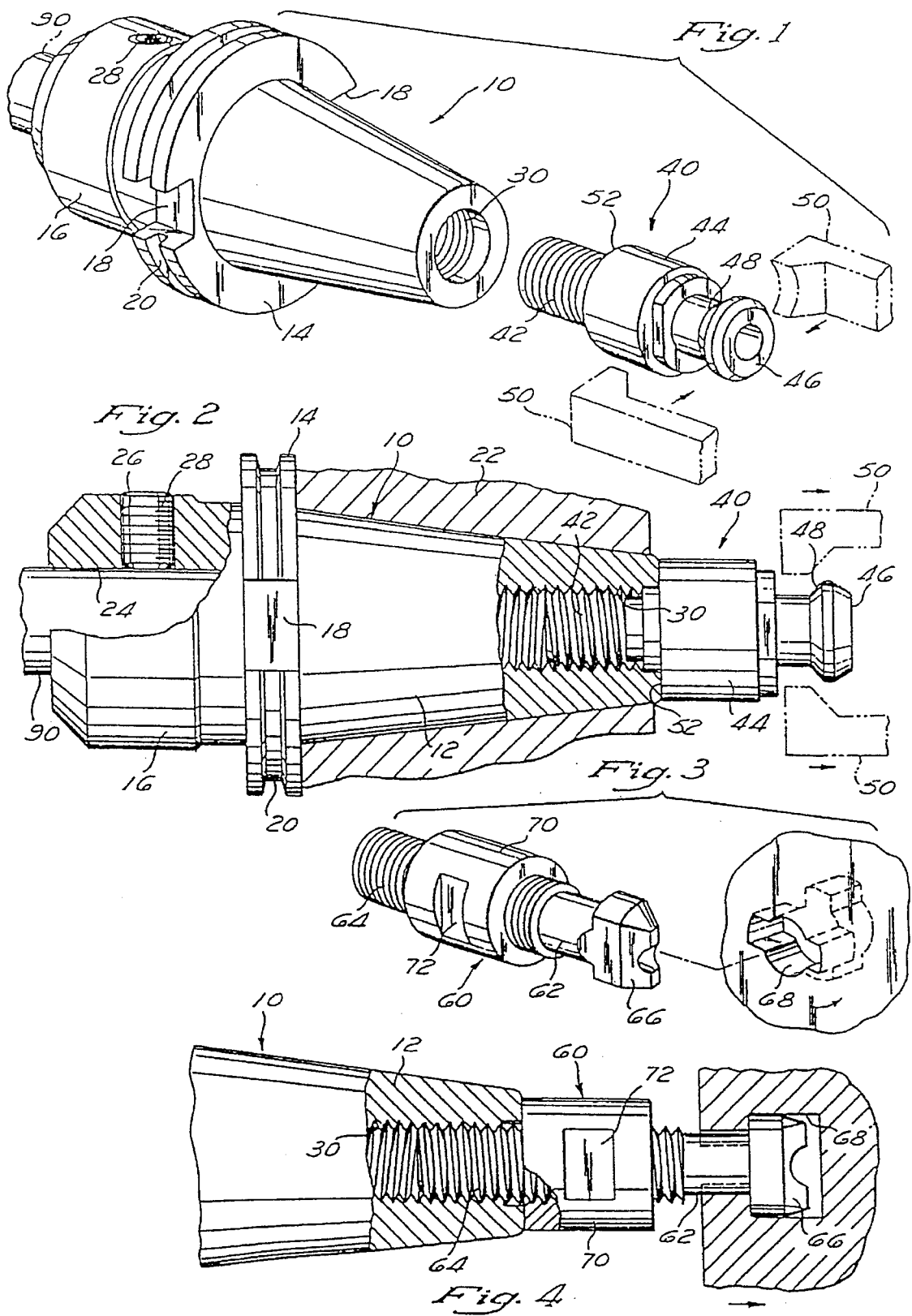

TOOL HOLDER SYSTEM AND METHOD OF USE

This application is a continuation of 08/049,085, filed on Apr. 15, 1993, which is CON of 07/496,810, filed Mar. 20, 1990, abandoned, which is CON of 07/293,817, filed Jan. 5, 1989, abandoned, which is DIV of 07/063,975, filed Jun. 19, 1987, abandoned, which is DIV of 06/930,687, filed Nov. 12, 1986, now U.S. Pat. No. 4,818,161, which is CON of 06/787,034, filed Oct. 15, 1985, abandoned.

BACKGROUND OF THE INVENTION

The present invention broadly relates to the machine tool art and, more particularly, to an improved tool holder system and method of utilizing the same.

As is well known, various tool holders have been utilized in the prior art which interface with a rotating spindle of a machine tool such as a milling or boring machine to securely hold a cutting tool upon the machine during cutting of a workpiece. For the past fifty to sixty years it was customary practice for such tool holders to be manually inserted into the spindle of the machine tool and subsequently be drawn or pulled tightly into the spindle by way of a threaded draw bar extending axially through the spindle and into the end of the tool holder. However, with the relatively recent advent of high production numerical control and computer control machine tools, automated tool holder changers have been introduced which mechanically insert and remove the tool holder from the spindle of the machine tool.

In order to enable standardization in the manufacture of automated tool changer systems, basically four tool holder dimensional and configurational standards have been introduced in the machine tool art. These standards basically comprise: (1) the American standard, (2) the European DN standard, (3) the Japanese BT standard, and (4) the Caterpillar V-flange standard. These various tool holder dimensional and configurational standards are well known in the art and although all include various similarities in design, they each possess peculiar design features which have heretofore prevented their interchangability in various automated tool holder changer systems. In this regard, a particular automated tool holder changer system could only be utilized or interfaced with a particular one of the standard tool holder configurations. Thus, in most instances, inventory of all of the above-standard tool holders has been required which, as will be recognized, adds substantially to overall production costs and reduces production efficiency. Further, such standard tool holder configurations utilized for automated tool holder changers have typically not been adaptable to be utilized in manual systems thereby additionally increasing overall inventory costs.

In addition to the above-mentioned inventory deficiencies, modern high tolerance machining techniques have further dictated that current tool holders be capable of permitting rapid height adjustment setting of the cutting tool within the tool holder and subsequently prevent any movement, i.e. backing out of the cutting tool from the tool holder during machining of a workpiece. It has been customary practice that this positioning or presetting of the height of the cutting tool within the tool holder be accomplished in a manual trial and error method with the machinist manually reciprocating the shank portion of the cutting tool within the central aperture of the tool holder. Once the height was manually obtained and verified, securing of the cutting tool within the tool holder was typically accomplished by way of a set screw extending perpendicularly through the tool holder to tightly contact or abut a flat formed on the shank portion of the cutting tool. As will be recognized, this manual trial and error method of setting the cutting tool height within the tool holder has proven timely and costly while the retention of the cutting tool within the tool holder by use of the perpendicularly disposed set screw has often resulted in the backing out of the cutting tool from the tool holder during the machining operation. Although recently this backing out deficiency has been recognized wherein a set screw has been inclined from the perpendicular to prevent the cutting tool from backing out of the tool holder, the height setting deficiencies have not to date been addressed in the prior art.

Further, due to the central aperture of the tool holders typically being formed approximately one to two ten-thousandths of an inch greater in diameter than the shank portion of the cutting tool to enable manual reciprocation of the cutting tool within the tool holder, all of the prior art tool holders have been susceptible to non-concentric mounting of the cutting tool therein which in modern high tolerance machining applications has proved unacceptable.

Thus, there exists a substantial need in the art for an improved tool holder system and method of use which reduces the inventory requirements of the various standard tool holder configurations, permits use of the tool holder in both manual and automatic tool changer systems, permits ease in setting tool height within the tool holder, prevents backing out of the cutting tool from the tool holder during the machining operation, and ensures concentric mounting of the cutting tool within the tool holder.

SUMMARY OF THE PRESENT INVENTION

The present invention specifically addresses and alleviates the above-referenced deficiencies associated in the prior art. More particularly, the present invention comprises an improved tool holder system and method of utilizing the same which is characterized by use of plural extension member assemblies which permit the rapid adaptation of the various standard conventional machine tool holders for use in both automatic machine tool changer systems as well as manual machine tool changer systems. By use of the plural extension member assemblies of the present invention, the various American standard, European DN standard, Caterpillar V-flange and Japanese BT standard tool holders can be rapidly adapted for use on all automated tool changer systems.

In addition, the present invention discloses a method of retrofitting existing conventional tool holders and cutting tools such as an end mill which permits the rapid pre-setting and adjustment of the height of the cutting tool within the tool holder. Basically, this improvement comprises the modification of the cutting tool to include a threaded aperture in its shank end which receives a threaded member extending through the rear of the tool holder. The threaded aperture formed in the cutting tool is formed to have a reverse thread pitch as compared to the thread pitch formed in the aperture of the tool holder such that during rotation of the threaded member, the cutting tool is axially reciprocated upwardly and downwardly within the tool holder. Due to the pre-set or height adjustment of the cutting tool within the tool holder being facilitated by the threaded member, fine or vernier type adjustments in the height of the cutting tool within the tool holder can be effectuated.

Subsequently, a pair of set screws are utilized in the tool holder to rigidly mount the cutting tool within the tool holder and positively eliminate any backing out of the cutting tool from the tool holder during the cutting operation. This particular embodiment of the present invention is applicable to all types of tool holders including modern collet-type tool holders which grip the cutting tool circumferentially about the periphery of the cutting tool.

In a further embodiment of the present invention, a conventional tool holder is modified such that its central aperture is slightly less than the diameter of the shank portion of a cutting tool, and the cutting tool is inserted into the tool holder by the application of heat to the tool holder whereby through thermal expansion, the effective diameter of the central aperture of the cutting tool is increased. With this increased diameter, the cutting tool may be pressed into the aperture to a desired pre-set height. The externally applied heat may then be removed from the tool holder wherein due to thermal contraction, the effective diameter of the central aperture in the tool holder decreases, causing a metal to metal press fit to exist between the shank portion of the cutting tool and the tool holder. Due to this metal to metal contact, concentricity of the cutting tool within the tool holder is ensured.

DESCRIPTION OF THE DRAWINGS

These as well as other features of the present invention will become more apparent upon reference to the drawings wherein:

FIG. 1 is an exploded perspective view illustrating the extension member assembly of the present invention utilized to adapt a conventional standard tool holder for use on an automatic tool holder system;

FIG. 2 is a partial cross-sectional view illustrating the mounting of the extension member assembly upon the tool holder of FIG. 1;

FIG. 3 is a perspective view showing an additional extension member assembly of the present invention adapted for use on a bayonet-type automatic tool holder changer system;

FIG. 4 is a partial cross-sectional view showing the installation of the extension member assembly of FIG. 3 upon a tool holder;

DETAILED DESCRIPTION OF THE PREFERRED EMBODIMENT

Figure 5:
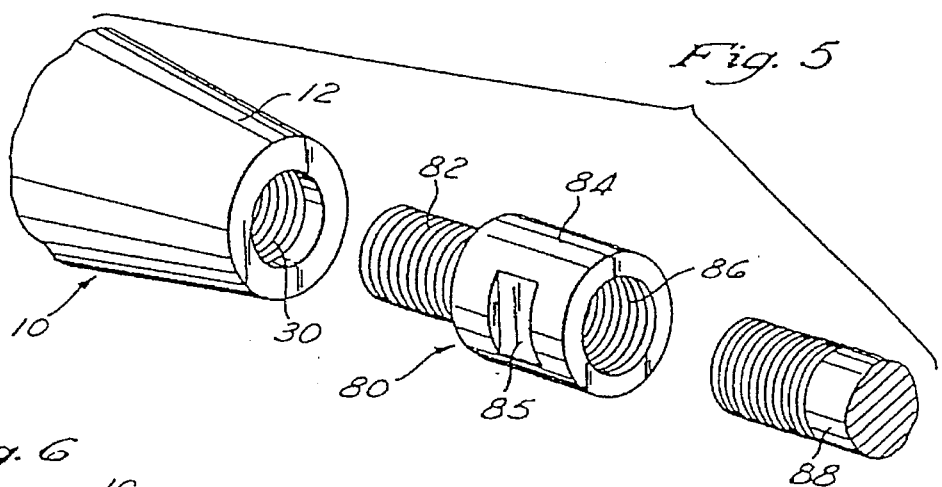
FIG. 5 is an exploded perspective view showing an additional extension member assembly of the present invention for use on a manual draw bar type tool holder.

Referring to FIGS. 1 and 2, there is shown a conventional tool holder 10 which as depicted for purposes of explanation comprises a standard Caterpillar V-flange tool holder but additionally may comprise an American standard, European standard DN, or Japanese standard BT type tool holder. As is conventional with all of the standard tool holders, the tool holder 10 includes a tapered shank portion 12, flange portion 14, and cutting tool mounting portion 16. The flange portion 14 includes a pair of mounting recesses 18 as well as a circumferentially extending V-shaped recess 20. As is well known, the V-shaped recess 20 serves as a means for allowing an automated tool holder changer (not shown) to carry and contact the tool holder 10 for automatic removal and insertion of the tool holder 10 from the spindle 22 of a machine tool such as a milling machine, while the recesses 18 each receive a drive lug (not shown) rigidly mounted to the spindle 22 of the machine to transmit rotary motion of the spindle to the tool holder 10 when the tool holder 10 is mounted within the spindle 22.

The cutting tool holder portion 16 of the tool holder 10 includes a central aperture 24 which extends from the distal end of the cutting tool holder portion 16 axially toward the opposite end of the tool holder to a depth approximately comenserate with the location of the flange portion 14. The diameter of the aperture 24 is typically sized to be approximately two to five ten-thousandths of an inch greater than the diameter of the shank of the cutting tool 90, for instance an end mill, which is desired to be inserted within the tool holder 10. A threaded aperture 26 extends radially through the cutting tool holder portion 16 and threadingly receives a set screw 28 which is manipulative to contact or abut the periphery of the cutting tool maintained within the aperture 24 and thereby maintain the cutting tool within the aperture 24. The distal end of the tapered shank portion 12 of the tool holder 10 is provided with a threaded aperture 30 which extends axially toward the flange portion 20. Those skilled in the art will recognize that the particular tool holder 10 depicted and described above is substantially similar for all of the standard tool holder dimensional configurations such as the American standard, Japanese BT, European BN and Caterpiller V-flange standards with the major difference being in the axial lengths of the taper portion 12 and flange portion 14.

The present invention contemplates the use of an extension member assembly or extension member 40 which may be rapidly mounted to the end of the tapered shank portion of the tool holder 10 to adapt the tool holder 10 for use in automatic tool changer systems. As shown in FIGS. 1 and 2, the extension member 40 comprises an elongate member having a threaded end portion 42 sized to threadingly engage the threaded aperture 30 formed in the tool holder 10, an enlarged diameter central portion 44 and a retention knob portion 46. The retention knob portion 46 is formed in a bulbous configuration having a frustro-conical shaped flange 48 which is adapted to engage a pair of draw bar ears or retention members 50 (depicted in phantom lines in FIGS. 1 and 2) of a conventional tool changer retention device disposed within the interior of the spindle 22 of the machine tool.

Referring more particularly to FIG. 2, adaptation of the conventional tool holder 10 is accomplished by merely threading the extension member 44 into the threaded aperture 30 formed in the tapered portion 12 of the tool holder 10 until such time as the annular sholder 52 formed on this enlarged central portion 44 abuts the distal end of the taper portion 12 of the tool holder 10. The tool holder 10 with a cutting tool mounted within the central aperture 24 may then be automatically inserted into the spindle 22 of the machine tool by the automatic tool changer mechanism (not shown) which holds the tool holder 10 by interaction with the V-shaped channel 20 formed on the flange portion 14 of the tool holder 10. The tool changer then enters the tapered portion 12 of the tool holder 10 into a complementary shaped opening of the spindle 22. The tool holder retention members 50 then are automatically operative to move radially inward toward the retention knob 46 as depicted in FIG. 1 and upon contacting the same, subsequently move axially away from the flange portion 20 as depicted by the arrows in FIG. 2 whereby abutment with the frustro-conical shaped annular sholder 48 securely draws the tool holder inwardly and mounts the tool holder 10 within the spindle 22.

As will be recognized, by use of the extension member 40, all of the standard tool holder dimensional configurations can be utilized in an automated tool changer mechanism with any differences in the axial length of the taper portion being accommodated by axial threaded adjustment of the extension member 44 within the aperture 30 such that engagement of the retention knob portion 48 of the extension member is ensured with the retention members 50 of the spindle retention mechanism.

Referring to FIGS. 3 and 4, there is shown a second embodiment of the extension member assembly or extension member 60 which is utilized in a manner analogous to that described in FIGS. 1 and 2 to adapt a conventional tool holder 10 for use in a conventional bayonet-type automatic tool holder assembly. As best shown in FIG. 3, in this second embodiment, the extension member 60 comprises an elongate member 62 having a threaded portion 64 extending throughout the majority of its length and a bayonet end portion 66 at its distal end. The threaded portion 64 is sized to be threadingly engaged within the threaded aperture 30 formed in the tool holder 10 while the bayonet end portion 66 is sized to be received within a keyway-like opening or aperture 68 formed in a conventional bayonet type tool holder retention mechanism disposed within the spindle 22 of the machine tool. An enlarged diameter lock down cylinder 70 is threadingly positioned upon the length of the threaded portion 64 which includes a pair of wrench lug recesses 72 formed about its periphery.

Referring more particularly to FIG. 4, the extension member 60 is installed upon the tool holder 10 by manually threading the threaded portion 64 into the threaded aperture 30. Depending upon the particular type of standard tool holder 10 being utilized, the extension member 60 is threaded into the aperture 30 to a preset distance and subsequentially locked into that preset position by threading the lock down cylinder 70 tightly against the end of the tool holder 10. The tool holder 10 with the extension member 60 disposed thereon may then be inserted into the spindle 22 of the machine tool by way of an automated tool changer mechanism (not shown) such that the bayonet end portion 66 of the extension member 60 passes through the complementary shaped opening 68 formed in the tool changer retention mechanism. Positioned in such a manner, the tool changer retention mechanism automatically rotates ninety degrees as depicted by the phantom lines in FIG. 3 and subsequently moves axially away from the tool holder 10 in a direction indicated by the arrow in FIG. 4 causing the tool holder 10 to be pulled tightly into the spindle 22. As such, it will be recognized that by use of the extension member 60, standard tool holders 10 may be adapted for use in bayonet style automated tool changer mechanisms.

Referring to FIG. 5, a third embodiment of the extension assembly or extension member 80 of the present invention is depicted which is utilized to adapt the various conventional standard tool holders 10 for use on a manual draw bar type mechanism. In this embodiment, the extension member 80 comprises an elongate member having a threaded end portion 82 sized to be threadingly received within the aperture 30 formed in the tool holder 10 and an integrally formed increased diameter cylinder portion 84 which preferably includes a pair of wrench lug recesses 85 formed about its periphery. The cylinder portion 84 additionally includes a threaded aperture 86 extending substantially throughout its length which is sized to receive a conventional draw bar 88 of the machine tool.

Figure 6:
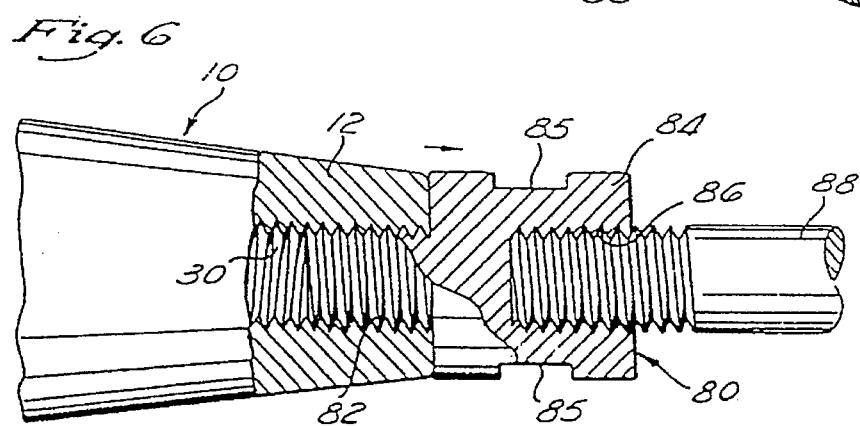
FIG. 6 is a partial cross-sectional view illustrating the installation of the extension member assembly of FIG. 5 upon a tool holder.
Figure 7:
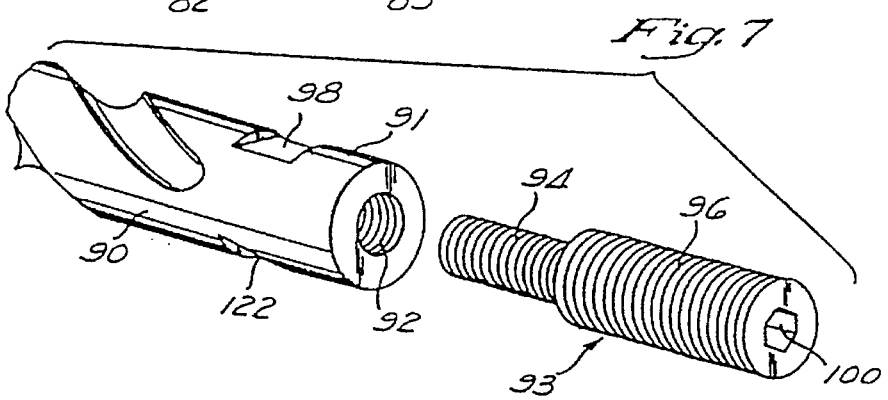
FIG. 7 is a perspective view illustrating the modification of a conventional cutting tool for engagement with an elongate threaded member of the present invention.

As best shown in FIG. 7, the extension member 80 is mounted upon the tool holder 10 by threadingly inserting the threaded portion 82 into the threaded aperture 30 of the tool holder until such time as the central portion 84 tightly abuts the end of the tool holder 10. The tool holder 10 may then be manually positioned within the spindle 22 of the machine tool and the conventional draw bar 88 may be inserted through a spindle and be threadingly engaged within the aperture 86 formed in the extension member 80. Continued threading insertion of the draw bar 88 within the aperture 86 causes the tool holder 10 to be drawn inwardly in a direction indicated by the arrow in FIG. 6 and be tightly received within the spindle 22 of the machine tool.

As such, by way of the three embodiments of the universal extension assembly of the present invention, conventional tool holders 10 may be modified in a simple and effective manner to permit their use in differing automated tool holder changer systems as well as for use in conventional manual draw bar systems. As such, inventory costs of separate standard tool holders such as the American standard, European standard DN, Japanese standard BT and Caterpillar V-flange tool holders can be eliminated with any of the above-standard tool holder being rapidly modified to be utilized on differing equipment.

Figure 8:
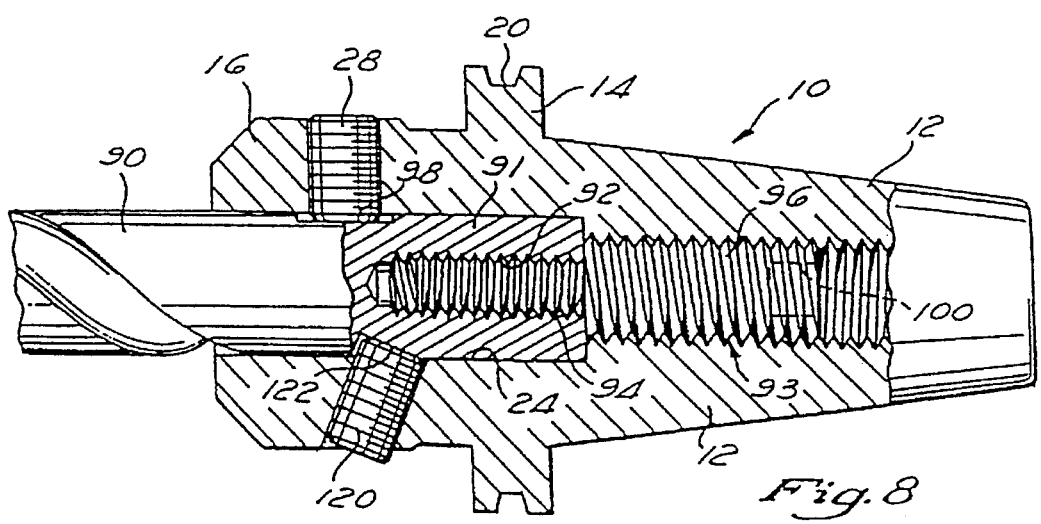
FIG. 8 is a cross-sectional view illustrating the installation of the elongate threaded member and cutting tool of FIG. 7 in a tool holder.

Referring to FIGS. 7 and 8, there is depicted the method and apparatus of the present invention utilized to permit the rapid presetting of the cutting tool within the tool holder 10 and subsequently permit the secure mounting of the cutting tool within the tool holder 10 to eliminate any backing up or movement of the cutting tool within the tool holder during the cutting operation. In this embodiment of the present invention, it is contemplated that the cutting tool such as an end mill 90 is modified to include a threaded aperture 92 extending axially upward along the length of the shank portion 91 of the end mill 90. Preferably, the threaded aperture 92 is sized to receive a threaded member 93 which is provided with a first threaded portion 94 and a second increased diameter threaded portion 96. The threaded portion 94 and threaded aperture 92 are preferably formed to have a left hand threaded pitch orientation while the portion 96 is formed to have an opposite or right hand threaded pitch orientation.

In order to mount the modified end mill 90 within the tool holder 10, the threaded portion 96 of the elongate threaded member 93 is manually threaded through the aperture 30 formed in the tapered portion 12 of the tool holder 10 such that the threaded portion 94 of the elongate threaded member 93 resides within the aperture 24 formed within the tool holder 10. The end mill 90 may then be manually positioned within the aperture 24 formed within the tool holder 10 and may be manually rotated so that the threads of the threaded aperture 92 engage the threaded portion 94 of the elongate threaded member 93. Positioned in such a manner, the set screw 28 formed in the tool holder 10 may be preliminarily tightened upon the end mill 90 in an amount sufficient to contact the flat 98 typically formed upon the end mill 90. Preferably, the abutment of the set screw 28 upon the flat is relatively moderate to allow subsequent axial reciprocal movement of the end mill 90 within the aperture 24 yet prevent any rotational movement of the end mill 90 within the aperture. Subsequently, a suitable allen wrench (not shown) may be inserted through the distal end of the tapered portion 12 of the tool holder 10 to engage the complementary shaped allen wrench aperture 100 formed in the threaded member 93. A user may subsequently manually turn the threaded member 93 by turning the allen wrench (not shown) whereby the threaded portion 96 will axially travel within the threaded aperture 30. Due to the threaded portion 94 and threaded aperture 92 being formed with a left hand threaded pitch as opposed to the right hand threaded pitch of the threaded portion 96, during this rotational movement, the end mill 90 will be restrained from rotational movement by the set screw 28 but will axially reciprocate within the aperture 24 in an amount comenserate with the pitch of the threaded aperture 92. As such, the precise height of the end mill 90 within the tool holder 24 can be achieved.

Upon completion of the setting of the height of the end mill 90 within the tool holder 10, the set screw 28 may be manually tightened a substantial amount to secure the end mill 90 in its desired position. In addition, an angularly inclined set screw 120 is provided in the tool holder which may be manually tightened to engage an angularly inclined flat 122 formed on the end mill 90. Due to the angular inclination of the set screw 120 it will be recognized that during the cutting operation the end mill 90 is prevented from backing out of the aperture 24 or, i.e. moving within the aperture 24.

Due to the shank portion 91 of the end mill 90 typically being non-heat treated, the formation of the aperture 92 within conventional cutting tools such as end mills can be easily facilitated. Further, the formation of the threaded aperture 92 within the cutting tool or end mill 90 does not adversely affect the structural integrity of the end mill 90 such that the same can be utilized in a conventional manner without the use of the threaded member 93. Thus, by use of the present invention, accurate presetting of the height of the cutting tool 90 within the tool holder 10 can be rapidly achieved and once achieved, can be securely maintained throughout the cutting operation.

Figure 9:
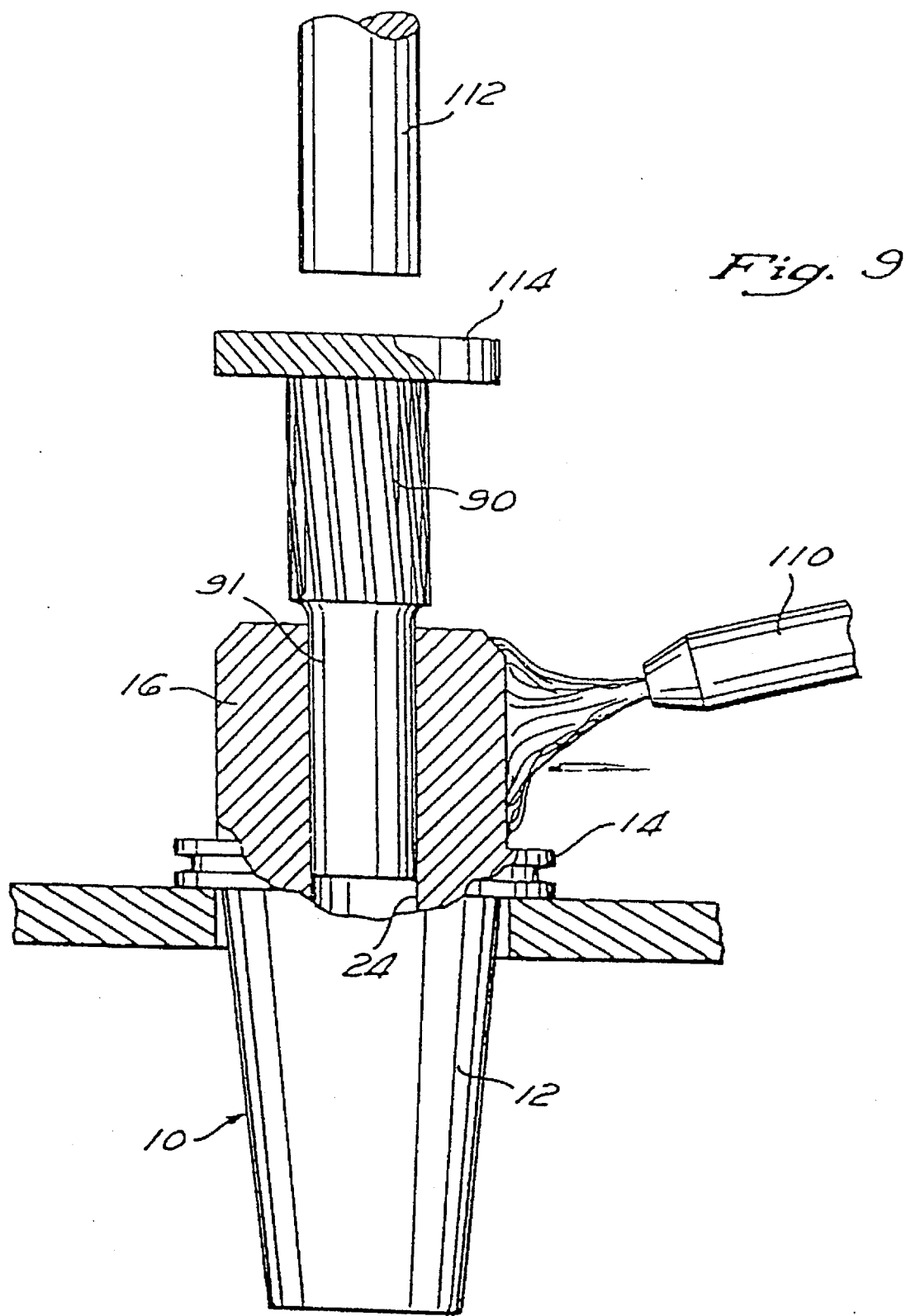
FIG. 9 is a partial cross-sectional elevational view illustrating an additional embodiment of the present invention wherein the cutting tool is inserted into the tool holder by the application of external heat.

In FIG. 9, an additional embodiment of the present invention is disclosed which is particularly suited to eliminate eccentricity in the mounting of the cutting tool 90 within a tool holder 10. In this embodiment, the central aperture 24 formed in the tool holder 10 is preferably formed to be approximately one to three ten-thousandths of an inch less in diameter than the shank portion 91 of the cutting tool 90. As such, in order to mount the cutting tool 90 within the tool holder 10, the tool holder portion 16 of the toot holder 10 is externally heated as by way of a gas flame or electric heating element 110. Due to the thermal expansion characteristics of the tool holder 10, the application of the external heat energy to the tool holder 10 causes the central aperture 24 to enlarge in an amount sufficient to allow the shank portion 91 to be press fit therein. Typically this is accomplished by pressing the end mill 90 downward within the aperture 24 as by way of a hand arbor press 112 which communicates with the end of the cutting tool 90 through a brass wafer 114 such that during downward travel of the end mill 90 by the force of the arbor press 112, the brass wafer 114 prevents any damage to the cutting surfaces of the end mill 90. When the end mill 90 is pressed a sufficient distance within the aperture 24, the external application of heat is discontinued and the tool holder 10 is allowed to cool back to ambient temperature wherein thermal contraction causes the aperture 24 to form a rigid interface between the tool holder 10 and the shank portion 91 of the end mill 90. As such, the end mill 90 is rigidly maintained within the tool holder 10 in a concentric fashion for high tolerance machining application.

Although for purposes of description certain material sizes and configurations have been described herein, those skilled in the art will recognize that various modifications to the same may be made without departing from the spirit of the present invention, and such modifications are expressly contemplated herein.

What is claimed is:

1. A tool holder system for high tolerance machining applications, comprising:

a cutting tool having a cylindrical shank portion defining a continuous, uniform outer surface of substantially constant diameter; and a unitary tool holder having a conically tapered end portion and a cutting tool mounting portion, said end portion being releasably mountable to a rotating spindle of a milling machine and said mounting portion including a central aperture extending axially therein which defines a continuous, uniform inner surface of substantially constant diameter, the diameter of the inner surface of the central aperture being slightly less than the diameter of the outer surface of the shank portion of the cutting tool;

said tool holder being formed of a material having thermal expansion and contraction characteristics such that the application of heat to the mounting portion of the tool holder thermally increases the diameter of the inner surface of the central aperture, thus allowing the shank portion of the cutting tool to be slidably inserted into the mounting portion of the tool holder to a desired axial position, and cooling the tool holder causes a thermal contraction of the inner surface of the central aperture in an amount sufficient to mount the cutting tool within the tool holder by facilitating a rigid interface between the inner surface of the central aperture and the outer surface of the shank portion;

the maintenance of the cutting tool concentricity relative the tool holder throughout the rotary motion of the rotating spindle, the transmission of torque from the tool holder to the cutting tool, and the maintenance of the axial position of the cutting tool within the tool holder all being facilitated solely by the engagement of the inner surface of the central aperture to the outer surface of the shank portion.

2. The system of claim 1 wherein the inner surface of said central aperture has a diameter of between 0.0001 and 0.0003 of an inch less than the diameter of the outer surface of the shank portion of the cutting tool.

3. The system of claim 1 wherein said end portion includes a threaded aperture extending axially therethrough for receiving an extension member to facilitate the mounting of the tool holder to the rotating spindle of the milling machine, said central aperture and said threaded aperture being coaxially aligned within the tool holder.

4. A tool holder system for high tolerance machining applications, comprising:

an end mill having a cutting portion and a cylindrically configured shank portion defining a continuous, uniform outer surface of substantially constant diameter; and a unitary tool holder having a conically tapered end portion and a cutting tool mounting portion, said end portion being releasably mountable to a rotating spindle of a milling machine and said mounting portion including a central aperture extending axially therein which defines a continuous, uniform inner surface of substantially constant diameter, the diameter of the inner surface of the central aperture being slightly less than the diameter of the outer surface of the shank portion;

said tool holder being formed of a material having thermal expansion and contraction characteristics such that the application of heat to the mounting portion thermally increases the diameter of the inner surface thus allowing the shank portion to be slidably inserted into the mounting portion to a desired axial position, and cooling the tool holder causes a thermal contraction of the inner surface in an amount sufficient to mount the end mill within the tool holder by facilitating a rigid interface between the inner and outer surfaces;

the maintenance of the end mill concentricity relative the tool holder throughout the rotary motion of the rotating spindle, the transmission of torque from the tool holder to the end mill, and the maintenance of the axial position of the end mill within the tool holder all being facilitated solely by the engagement of the inner surface of the central aperture to the outer surface of the shank portion.

* * * * *